United States Patent [19]
Cardinale

[11] 3,738,252
[45] June 12, 1973

[54] CONCEALED WINDSHIELD WIPER WELL HEATER

[76] Inventor: Albert J. Cardinale, 4734 Darford Avenue, Baltimore, Md. 21229

[22] Filed: July 14, 1971

[21] Appl. No.: 162,374

[52] U.S. Cl. ............ 98/2.1, 15/250.05, 15/250.16, 237/12.3 B
[51] Int. Cl. .............................................. A42l 1/16
[58] Field of Search ................ 237/12.3 B, 12.3 R; 165/17; 98/2.1; 52/171; 15/250.05, 250.16; 296/84 R

[56] References Cited
UNITED STATES PATENTS
2,947,020   8/1960   Wilfert............................. 15/250.16
3,416,428   12/1968  Heller.................................... 98/2.1

FOREIGN PATENTS OR APPLICATIONS
465,857   5/1937   Great Britain ................ 237/12.3 B
454,437   9/1936   Great Britain ................ 237/12.3 B Primary Examiner—Manuel A. Antonakas
Attorney—Robert I. Dennison, Donald L. Dennison, Aaron R. Townshend et al.

[57] ABSTRACT

Ice, sleet, and snow accumulated or accumulating in the concealment well of an automobile windshield wiper assembly is melted away by heat from a hot water radiator located in the well and constituting part of a hot water heating system circulated from and including the water jacket of the automobile engine.

2 Claims, 2 Drawing Figures

PATENTED JUN 12 1973 3,738,252

INVENTORS
Albert J. Cardinale

BY Dennison, Dennison, Townsend
& Marvale
ATTORNEYS

CONCEALED WINDSHIELD WIPER WELL HEATER

BACKGROUND

1. Field of the Invention

The present invention relates to the art of windshield wiper assemblies, and in particular to automobile windshield wipers that are concealed when not in operation.

2. The Prior Art

At the present stage of development in the automobile industry, windshield wiper assemblies are conventionally concealed in open-top wells at the base of the windshield when the wiper blades are not in operation. Snow, sleet, and ice from freezing rain accumulates overnight in the wells of cars not sheltered in garages, and freezes into a solid mass encasing the wiper arms and blades and preventing their operation so that they must be broken out before they can operate. Force applied in breaking out frozen wipers often damages the wiper assembly, requiring replacement of parts. If the driver inadvertently neglects to free the blades, motor damage will result. In heavy snow conditions the blades of an operating wiper moving on downstrokes will pack snow in the concealment well so that it builds up to a height that blocks normal operation of the wiper blades and sometimes entirely prevents their operation. This often results in damaging overloads on the electric motors by which present day windshield wipers are conventionally operated. So far as I am aware, the art prior to the advent of my present invention has not taught the use of any means for melting ice, snow, and sleet accumulating in concealed windshield wiper wells. Instead, prior art development has been confined to means for heating the surfaces of the windshields themselves to prevent snow and ice accumulation while the blades are in operation.

SUMMARY OF THE INVENTION

The present invention avoids the disadvantages of the prior art by melting away all accumulations of ice, snow, and sleet within the confines of a conventional concealed windshield wiper assembly well and also window washer components housed therein with heat derived from the engine of an automobile on which the wiper assembly is mounted. The invention provides means for heating ambient air within the well by engine-heated fluid circulated through the interior of the well either continuously while the engine is in operation or on demand from an operator of the vehicle. Basically, the invention is a method and means for heating the interior of a windshield wiper concealing well. Concomitantly, it is a means for directing a guided current of heated air upwardly over the outer face of a windshield for preventing accumulation of ice and snow thereon.

DESCRIPTION OF PREFERRED EMBODIMENT

Figure 1:
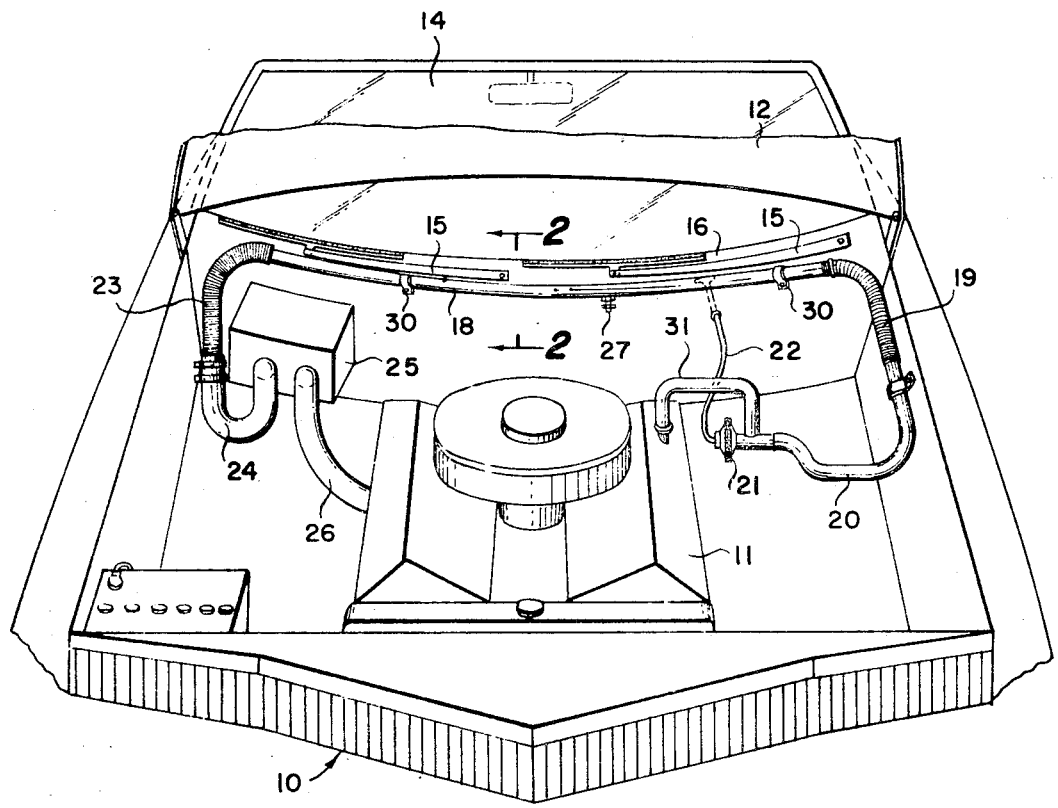
FIG. 1 is a front elevation of a typical engine compartment of an automobile equipped with the present invention, and with the hood in raised position.
Figure 2:
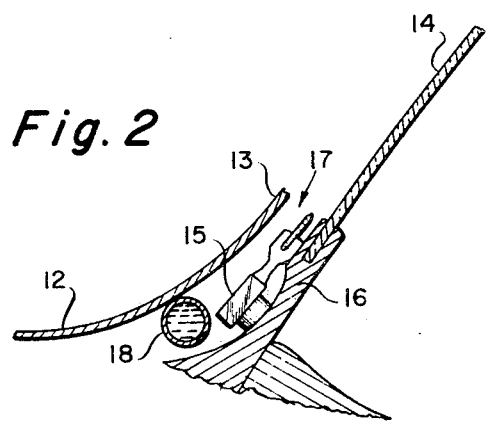
FIG. 2 is a sectional view taken on line 2—2 of FIG. 1.

In the embodiment of the invention disclosed herein, the invention is illustrated as applied in association with a conventional automobile body 10 having a forward engine compartment housing an engine 11 normally covered by a hood 12, the rear edge portion of which is formed with an upturned lip 13 that is spaced from and substantially parallel to the inclined windshield 14. The base of the windshield is below the edge of the hood lip 13, and this lip is spaced forwardly from the windshield a distance sufficient to provide ample clearance for the arms and blades of a conventional windshield wiper assembly 15 when it is in operation. As seen in FIG. 2, the clearance space between the rear lip portion 13 of the hood and the base of the windshield together with its support wall 16 constitutes a well 17 which houses and conceals the wiper assembly when it is not in operation. Actually, this well is a channel open at its upper end to the base of the windshield and at its lower end to the interior of the engine compartment. All the structure thus far detailed is conventional in the art.

The heating means of the present invention is here shown as a tube 18, preferably of copper, disposed in the concealment well beneath the hood lip 13 close to and slightly in advance of the bottom portion of the wiper assembly, between that assembly and the lower edge of the well channel. The tube 18 is secured to the windshield base support 16 by suitable attachment means such as clips 30 and extends over the full length of the well from one side of the automobile to the other. One end of the tube has a flexible hose connection 19 to a conduit 20 that leads from the water jacket of the engine 14 via branch pipe 31. Conduit 20 is controlled by a valve 21 that is manually operated by a flexible transmission shaft 22 leading to a conventional actuator (not shown) on the interior dashboard control panel of the automobile. The other end of the tube 18 has a hose connection 23 to a conduit 24 that is in communication with the heater box 25 of a conventional dashboard mounted heater for the interior of the automobile. A conduit 26 leads from the box 25 to the water jacket of the engine. The tube 18 may be provided with a conventional bleed valve 27. The tube 18, together with its connections 19, 20, 23, 24, 25 and 26, constitutes a system for circulating hot water from the engine 14 through the windshield wiper concealment well 17 and heater 25 back to the engine whenever the control valve 21 is opened while the engine is running. It is within a purview of my invention that, if desired, the system could be arranged to bypass the heater 25 for operation independently thereof, as would be obvious to one skilled in the art.

Ancillary to its function of melting away ice, snow, and sleet accumulated or accumulating in the wiper concealment well, the tube 18 functions also to heat ambient air in the well so that it rises through the open top of the well and is guided by the hood lip 13 to pass up and over the face of the windshield and thus warm it to prevent formation of ice thereon. Heated air rising by convection from the well is replaced by air from the engine compartment drawn through the lower end of the well channel so that a continuous current of heated air is discharged through the open top of the well so long as hot water from the engine water jacket is passed through the tube 18.

It will be apparent from the foregoing description that the tube 18 is a hot water radiator located in the windshield wiper concealment well. Ordinarily, the temperature of water passing through the tube is around 175°F. At times it may be in the neighborhood of 200°F. At such temperatures, the ambient air in and passing through the well is at an elevated temperature more than sufficient to melt away ice, sleet, and snow lodged or accumulating in the well. Due to the high heat conductivity of the material of tube 18, it will commence its melting function within only several minutes after a cold engine is started.

It has also been found that in the event of an overheated engine, actuation of the control valve 21 will bring the well heater into the hot water circuit, providing an additional radiator surface to aid in cooling down of the hot engine.

I claim:

1. In an automobile having a windshield, in combination a windshield wiper concealment well open at both its top and bottom, the bottom portion of said well being in communication with the engine compartment of the vehicle, a heating conduit extending across said well, conduit means connected to the automobile engine water coolant system and to said heating conduit for circulating engine-heated water therethrough, whereby forced air passing over said engine will pass into said well, over said heating conduit and onto the windshield of the automobile, the top of said well being spaced sufficiently close to the vehicle windshield so as to direct the forced air thereagainst.

2. In an automobile as defined in claim 1, and further including a valve in said conduit means between said engine water coolant system and said heating conduit to control the flow of hot water thereto.

* * * * *